Figures 1, 2, 3:
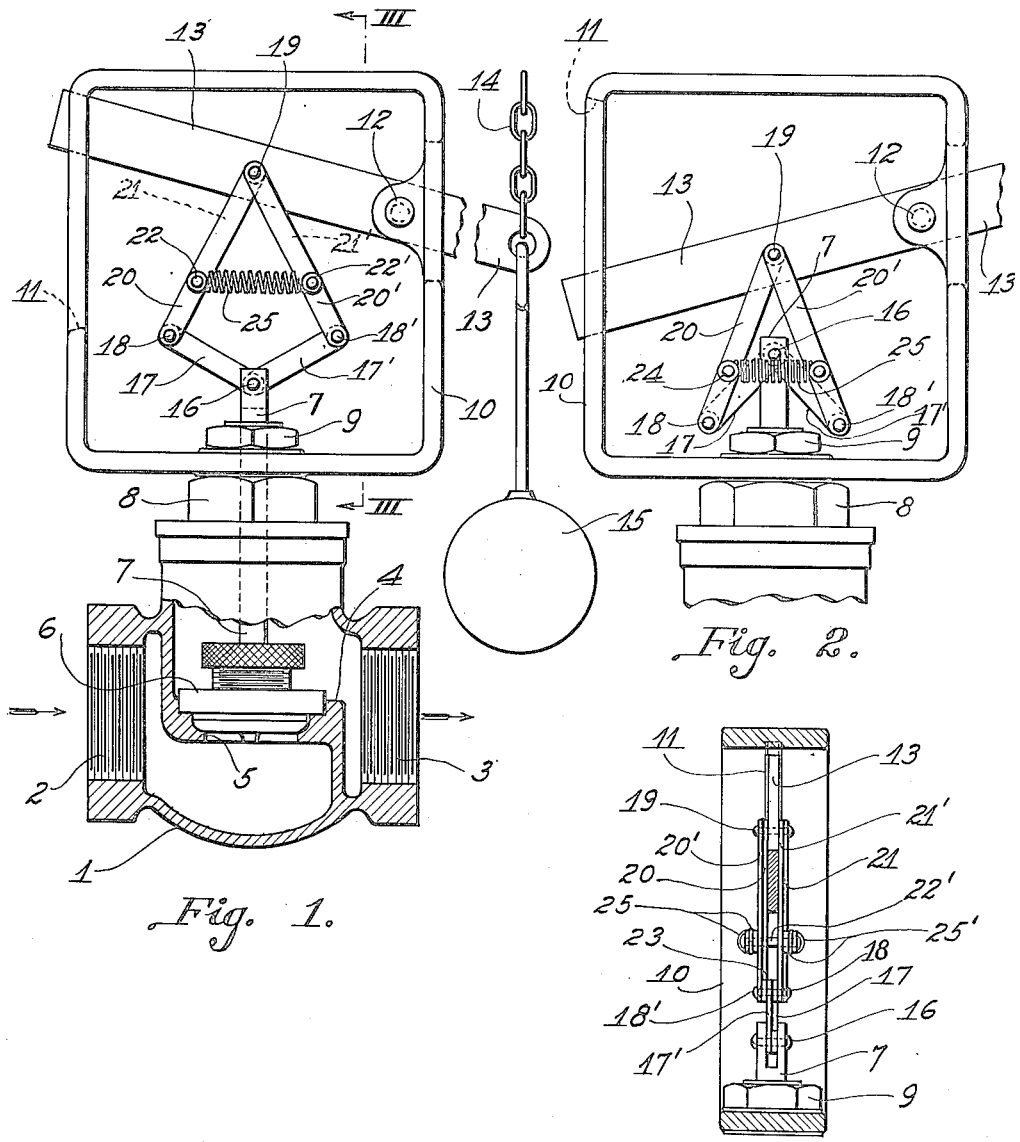

Dec. 18, 1923.    1,477,647
C. H. HOOK
SNAP ACTING GAS CONTROL VALVE
Filed April 30, 1923

WITNESSES

INVENTOR
Charles Howard Hook
By Winter & Brown
His Attys.

Patented Dec. 18, 1923.

1,477,647

UNITED STATES PATENT OFFICE.

CHARLES HOWARD HOOK, OF PITTSBURGH, PENNSYLVANIA.

SNAP-ACTING GAS-CONTROL VALVE.

Application filed April 30, 1923. Serial No. 635,481.

*To all whom it may concern:*

Be it known that I, CHARLES HOWARD HOOK, a citizen of the United States, and a resident of Pittsburgh, in the county of Allegheny and State of Pennsylvania, have invented a new and useful Improvement in Snap-Acting Gas-Control Valves, of which the following is a specification.

This invention relates to valves and particularly to valves adapted to be used as control valves for controlling the flow of air, gas or other fluids as for instance gas to the burners of a boiler or for other similar purposes.

It is an object of the invention to provide such a valve having a snap action, that is, one in which the valve head will be quickly and positively moved to full open position or to its completely closed position as occasion may demand.

It is a special object to provide a valve having a snap action in both opening and closing which is simple, compact, cheap to manufacture, comprising a minimum number of parts, easy to repair and efficient in operation.

Another special object is to provide such a device which is not influenced by small variations in the position of the actuating element controlling the valve caused by variations which usually occur during the normal operation of many controlling elements such as pressure diaphragms but which is responsive to immediately open or close the valve when the controlling element is displaced a predetermined extent.

A further special object is to provide a device of the character referred to in which the friction between the several parts is reduced to a minimum and in which the movement of the valve stem will be sensitively responsive to that of the actuating element controlling the valve, regardless of whether the actuating element is moved in one direction or the other.

A still further special object is to provide a valve equipped with a snap action consisting of a pair of toggles having their opposite extremities pivotally attached to the actuating lever and the valve stem, respectively, which toggles are constantly urged towards each other regardless of the position of the valve head, and in which the arms of the toggles pivoted to the actuating lever and to which the tension device is attached consists of spaced apart sections rigidly secured together whereby to prevent the said sections from becoming askew due to relative movement therebetween and consequently reducing the friction between the parts and increasing the sensitiveness of the operation.

In the accompanying drawings, Fig. 1 is an elevational view, partly in section, of the preferred embodiment of the invention, showing the several parts in position to close the valve; Fig. 2 a fragmentary elevation showing the positions which the parts assume when the valve is open; and Fig. 3 a section taken on the line III—III of Fig. 1.

The valve comprises a casing 1 provided with a passage extending therethrough from the inlet 2 to the outlet 3, and with the usual diaphragm 4 the port 5 of which is adapted to be closed by the head 6 attached to the stem 7 projecting through a suitable gland 8 to the exterior of the casing.

Fixed to the casing in any suitable manner, as by the nut 9, is a rectangular frame 10 provided with an elongated slot 11 at one side thereof. Pivotally mounted on the frame at a point opposite the slot 11, as at 12, is an actuating lever 13 having one end projecting through the slot 11 which serves to limit its travel in either direction, while its remaining end is attached to a chain 14 or rod leading to a movable controlling element for the valve, such as a pressure diaphragm or other well known similar controlling device in response to whose movements the valve is to be opened or closed. A counterweight 15 may also be suspended from this end of the lever.

Pivotally attached to the outer end of the valve stem 7 at 16 are the lower arms 17, 17', of two similarly constructed toggles the upper arms of which are pivotally attached at 18, 18', and at their outer extremities to the lever 13 at 19. The upper arm of each toggle consists of two rigidly connected and spaced apart sections, the arm associated with the arm 17 comprising the sections 20, 21, rigidly connected by the pin 22, while the arm associated with the arm 17' similarly comprises the spaced apart sections 20', 21', rigidly connected by the pin 22'. In order to centrally position the arms 17, 17', within the spaces between the lower ends of the upper arms spacing washers as indicated at 23 are employed, and each of the exterior faces of the sections of the upper arms are equipped intermediate their ends with anchoring lugs such as shown at 24. These anchoring lugs serve as means to which to attach the opposite extremities of a pair of retractile coil springs 25, 25' which constantly urge the toggles towards each other.

In the operation of the device as illustrated, whenever the position of the controlling element to which the chain 14 is attached moves the lever 13 from the position shown in Fig. 1 a sufficient distance to cause the pivotal points 18, 18' to pass below the pivotal connection 16, the springs 25, 25', will draw the upper arms of the toggles inwardly and force the arms 17, 17', to lift the valve stem 7 to the position shown in Fig. 2, opening the valve to its full extent. Whenever the controlling element moves the lever in the opposite direction, that is, from the position shown in Fig. 2 towards that shown in Fig. 1, as soon as the pivotal connections 18, 18' are raised above the pivotal connection 16, the parts will be caused to again assume the position shown in Fig. 1, causing the valve to close to its full extent.

It is to be noted that the movement of the lever 13 is limited in both directions by reason of the fact that the lever contacts the ends of the slot 11 in the frame 10, the length of the slot being slightly greater than is necessary to move the pivotal connections 18, 18' to the extent above noted.

It is therefore seen that in order to open the valve, it is necessary to move the lever from its position shown in Fig. 1 nearly to that shown in Fig. 2, and similarly in order to close the valve, the said lever must be moved from its position in Fig. 2 nearly to that of Fig. 1, in other words, in order to actuate the valve the lever must be moved throughout nearly its whole range of movement. Any intermediate position of the lever between those in which the pivotal connections 18, 18' and 16 are aligned will merely put the springs under more or less tension. It is therefore clear that any slight movements or vibrations of the controlling element attached to the chain 14 will not affect the position of the valve which is unresponsive until the lever 10 has reached its critical limits above described, but as soon as these limits have been exceeded the valve immediately responds to any additional movement and is moved to either its full open or full closed position with a snap action under the tension of springs 25, 25'. It is also clear that the gradual increase in the tension of the springs between these limits, regardless of the direction of movement of lever 13, acts as a damping or steadying mechanism preventing hunting of the controlling element.

The sections of the upper arms of the toggles are rigidly connected by the pins 22, 22', whereby to prevent relative movement between the sections avoiding their becoming askew under the influence of the tension springs. This, together with the symmetrical positioning of the several parts by disposing the lever 13 and the lower arms 17, 17' within the spaces between the sections of the upper arms, reduces friction between the parts to a minimum and enhances the sensitiveness of the operation.

It is thus seen that the invention provides a very simple and compact mechanism comprising but a very few parts which are associated in a unique manner whereby to relieve the parts of strains, friction, and undue wear, and one which is extremely sensitive and functions in an efficient manner for the purpose for which it is intended.

Although I have described the mode of operation of the preferred embodiment of the invention, as required by the patent statutes, it is not intended to limit the invention beyond that specifically defined in the appended claims.

I claim:

1. A valve comprising a casing provided with a passage therethrough, a valve head adapted to close said passage, a stem fixedly attached to the head and projecting outwardly through the casing to the exterior thereof, a frame fixed to the casing, a movable actuating member mounted on the frame, a pair of toggles having their opposite extremities pivoted to said stem and actuating member respectively, and means for constantly urging said toggles towards each other.

2. A valve comprising a casing provided with a passage therethrough, a valve head adapted to close said passage, a stem rigidly attached to the head and projecting outwardly through the casing to the exterior thereof, a frame fixed to the casing, a movable actuating member mounted on the frame, a pair of toggles having their opposite extremities pivoted to the said stem and actuating member respectively, and means for constantly urging the arms of the toggles adjacent the said actuating member towards each other.

3. A valve comprising a casing provided with a passage therethrough, a valve head adapted to close said passage, a stem attached to the head and projecting outwardly through the casing to the exterior thereof, a frame fixed to the casing, a lever pivoted to the frame, a pair of toggles having their opposite extremities pivoted to said stem and lever respectively, and means for constantly urging the toggles towards each other.

4. A valve comprising a casing provided with a passage therethrough, a valve head adapted to close said passage, a stem attached to the head and projecting outwardly through the casing to the exterior thereof, a frame fixed to the casing, a lever pivoted to the frame, a pair of toggles having their opposite extremities pivoted to said stem and lever respectively, and means for constantly urging the arms of the toggles adjacent the said lever towards each other.

5. A valve comprising a casing provided with a passage therethrough, a valve head adapted to close said passage, a stem attached to the head and projecting outwardly through the casing to the exterior thereof, a frame fixed to the casing, a lever pivoted to the frame, a pair of toggles having their opposite extremities pivoted to said stem and lever respectively, one of the arms of each of the toggles consisting of rigidly connected but spaced apart sections, and means for constantly urging the toggles towards each other.

6. A valve comprising a casing provided with a passage therethrough, a valve head adapted to close said passage, a stem attached to the head and projecting outwardly through the casing to the exterior thereof, a frame fixed to the casing, a lever pivoted to the frame, a pair of toggles having their opposite extremities pivoted to said stem and lever respectively, the arms of each of the toggles adjacent the lever consisting of rigidly connected but spaced apart sections, the lever being disposed in the spaces between the said sections adjacent their upper ends, the arms of the toggles connected to the stem being disposed in the spaces between the said sections adjacent their lower ends, and a spring having its opposite extremities fixed to the arms of the toggles adjacent the lever for constantly urging the said arms towards each other.

7. A valve comprising a casing provided with a passage therethrough, a valve head adapted to close said passage, a stem attached to the head and projecting outwardly through the casing to the exterior thereof, a frame fixed to the casing, a lever pivoted to the frame, a pair of toggles having their opposite extremities pivoted to said stem and lever respectively, the arms of each of the toggles adjacent the lever consisting of rigidly connected but spaced apart sections, the lever being disposed in the spaces between the said sections adjacent their upper ends, a spring having its opposite extremities fixed to the arms of the toggles adjacent the lever for constantly urging the said arms towards each other, one extremity of the said lever projecting through an elongated slot in the frame for limiting its travel in either direction, and means connected to the opposite extremity of the lever for actuating the same.

In testimony whereof, I sign my name.

CHARLES HOWARD HOOK.

Witnesses:
 THOMSON KING,
 OLIVE GRIMES.